(12) United States Patent
  Brox

(10) Patent No.: US 11,652,567 B2
(45) Date of Patent: May 16, 2023

(54) REPLACEMENT SCHEME FOR A PULSE AMPLITUDE MODULATED BUS

(71) Applicant: Micron Technology, Inc., Boise, ID (US)

(72) Inventor: Martin Brox, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/535,415

(22) Filed: Nov. 24, 2021

(65) Prior Publication Data

US 2022/0173827 A1    Jun. 2, 2022

Related U.S. Application Data

(60) Provisional application No. 63/120,018, filed on Dec. 1, 2020.

(51) Int. Cl.
  *H04L 1/00*       (2006.01)
  *H04L 25/49*      (2006.01)
  *G06F 13/16*      (2006.01)
(52) U.S. Cl.
  CPC ........ *H04L 1/0003* (2013.01); *G06F 13/1668* (2013.01); *H04L 25/4917* (2013.01)
(58) Field of Classification Search
  CPC .............. G06F 13/1668; H04L 1/0003; H04L 25/4917
  See application file for complete search history.

(56) References Cited

U.S. PATENT DOCUMENTS

| | | |
|---|---|---|
| 2012/0027413 A1 | 2/2012 | Agazzi |
| 2013/0195155 A1 | 8/2013 | Pan et al. |
| 2017/0134193 A1 | 5/2017 | Sugihara |
| 2019/0273640 A1 | 9/2019 | Lin et al. |
| 2019/0305995 A1* | 10/2019 | Lee ..................... H04B 3/32 |

FOREIGN PATENT DOCUMENTS

EP    1971098 A1    9/2008

OTHER PUBLICATIONS

"International Search Report and Written Opinion of the International Searching Authority," issued in connection with Int'l Appl. No. PCT/US21/72613, dated Mar. 21, 2022 (9 pages).

* cited by examiner

*Primary Examiner* — David S Huang
(74) *Attorney, Agent, or Firm* — Holland & Hart LLP

(57) ABSTRACT

Methods, systems, and devices for replacement scheme for a pulse amplitude modulated bus are described. A device may receive a signal indicative of a set of data associated with a multi-level modulation scheme that includes three or more levels. The device may determine, based on the signal, a first quantity of symbols corresponding to a first level of the multi-level modulation scheme and a second quantity of symbols corresponding to a second level of the multi-level modulation scheme. And the device may modify the signal, based on a sum of the first quantity and the second quantity satisfying a threshold, to replace one or more of the symbols corresponding to the first level with a respective symbol corresponding to a third level of the multi-level modulation scheme.

35 Claims, 10 Drawing Sheets

REPLACEMENT SCHEME FOR A PULSE AMPLITUDE MODULATED BUS

CROSS REFERENCE

The present application for patent claims the benefit of U.S. Provisional Patent Application No. 63/120,018 by BROX et al., entitled "REPLACEMENT SCHEME FOR A PULSE AMPLITUDE MODULATED BUS," filed Dec. 1, 2020, assigned to the assignee hereof, and expressly incorporated by reference herein.

FIELD OF TECHNOLOGY

The following relates generally to one or more systems for memory and more specifically to replacement scheme for a pulse amplitude modulated bus.

BACKGROUND

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

A device, such as an electronic device, may include one or more buses that facilitate communication between different components within the device, external to the device, or both. For example, a device may include a host device and a memory device that communicate with each other over a data bus. To increase reliability and efficiency, a transmitting device may modulate data according to a modulation scheme before transmitting the data over the data bus. For example, a transmitting device may modulate data according to a multi-level pulse-amplitude-modulation (PAM) scheme, such as PAM4 that uses four symbol levels to represent different symbols. But generation of some symbol levels may be associated with various disadvantages, such as increased cross current or increased termination current, compared to other symbol levels.

According to the techniques described herein, a transmitting device may employ a replacement scheme that allows the transmitting device to reduce the quantity of symbols associated with certain disadvantages (e.g., increased cross current, increased termination current) before transmission over a data bus. For example, in a first step of the replacement scheme, the transmitting device may, 1) determine that a set of data (e.g., a byte of data) has a threshold quantity of symbols associated with increased cross current, and 2) strategically replace one or more symbols to reduce the quantity of symbols associated with increased cross current. Also for example, in a second step of the replacement scheme, the transmitting device may, 1) determine that the set of data has a threshold quantity of symbols associated with increased termination current, and 2) strategically replace symbols to reduce the quantity of symbols associated with increased termination current. Thus, a device may employ a replacement scheme that allows the device to reduce the quantity of transmitted symbols that are associated with deleterious electrical phenomena. In some examples, a replacement scheme may also be referred to as an inversion scheme and the metadata symbol that indicates the replacements may be referred to as a data bus inversion (DBI) symbol.

Features of the disclosure are initially described in the context of a system and device as described with reference to FIGS. 1 and 2. Features of the disclosure are described in the context of method flows and replacement operations as described with reference to FIGS. 3-5. These and other features of the disclosure are further illustrated by and described with reference to apparatus diagrams and flowcharts that relate to replacement scheme for a pulse amplitude modulated bus as described with reference to FIGS. 6-10.

Figure 1:
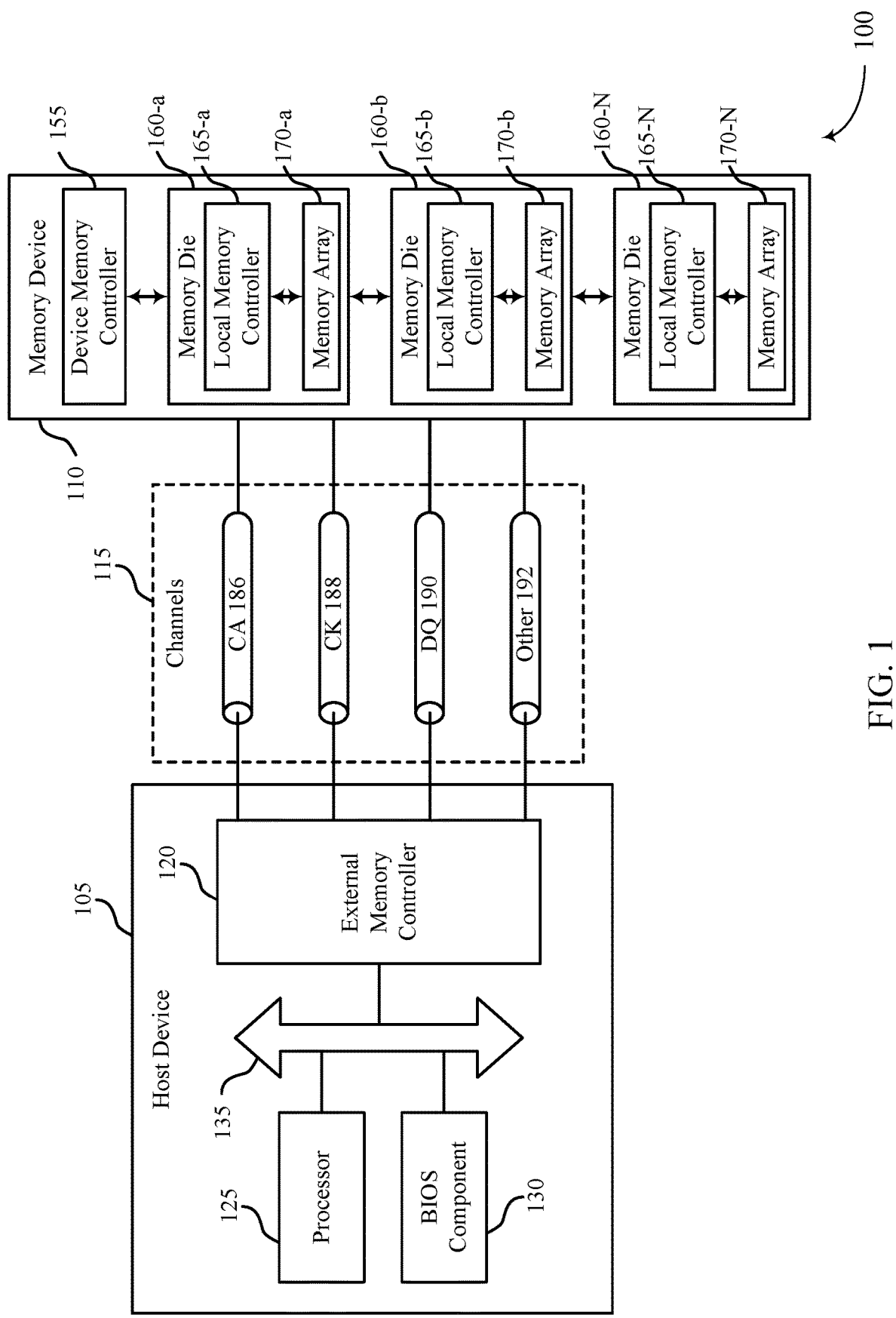
FIG. 1 illustrates an example of a system that supports a replacement scheme for a PAM bus in accordance with examples as disclosed herein.

FIG. 1 illustrates an example of a system 100 that supports a replacement scheme for a PAM bus in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of ROM, flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

Signals communicated over the channels 115 may be modulated using one or more different modulation schemes. In some examples, a binary-symbol (or binary-level) modulation scheme may be used to modulate signals communicated between the host device 105 and the memory device 110. A binary-symbol modulation scheme may be an example of a M-ary modulation scheme where M is equal to two. Each symbol of a binary-symbol modulation scheme may be operable to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some examples, a multi-symbol (or multi-level) modulation scheme may be used to modulate signals communicated between the host device 105 and the memory device 110. A multi-symbol modulation scheme may be an example of a M-ary modulation scheme where M is multiple, for example, greater than or equal to three. Each symbol of a multi-symbol modulation scheme may be operable to represent more than one bit of digital data (e.g., a symbol may represent a logic 00, a logic 01, a logic 10, or a logic 11). Examples of multi-symbol modulation schemes include, but are not limited to, PAM3, PAM4, PAM8, etc., quadrature amplitude modulation (QAM), quadrature phase shift keying (QPSK), and/or others. A multi-symbol signal (e.g., a PAM3 signal or a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

So, in some examples, a device may use a multi-level modulation scheme (e.g., a modulation scheme that includes at least three levels to encode more than one bit of information per modulation symbol) to a modulate a set of data for communication. As noted, a device may use a PAM scheme that uses different levels to represent different symbols. Such levels may also be referred to herein as symbol levels. In some examples, the device may use a PAM4 scheme that has four symbol levels each associated with a respective symbol. Due to the configuration of the device, transmission of certain symbols over a data bus may be associated with deleterious electrical phenomena (e.g., increased cross current, increased termination current), which may negatively impact device performance.

According to the techniques described herein, a device may employ a replacement scheme that allows the device to reduce the quantity of transmitted symbols that are associated with deleterious electrical phenomena. For example, the device may be configured to strategically replace certain symbols in a data set with other symbols before transmission, as described in more detail with reference to FIGS. 2 through 5. To ensure that a receiving device can reconstruct the original data set, the transmitting device may also transmit one or more metadata symbols (e.g., a data bus replacement (DBR) symbol) that indicates which symbols were replaced as part of the replacement scheme. In some examples, a replacement scheme may also be referred to as an inversion scheme and the metadata symbol that indicates the replacements may be referred to as a data bus inversion (DBI) symbol, among other examples.

Figure 2A:
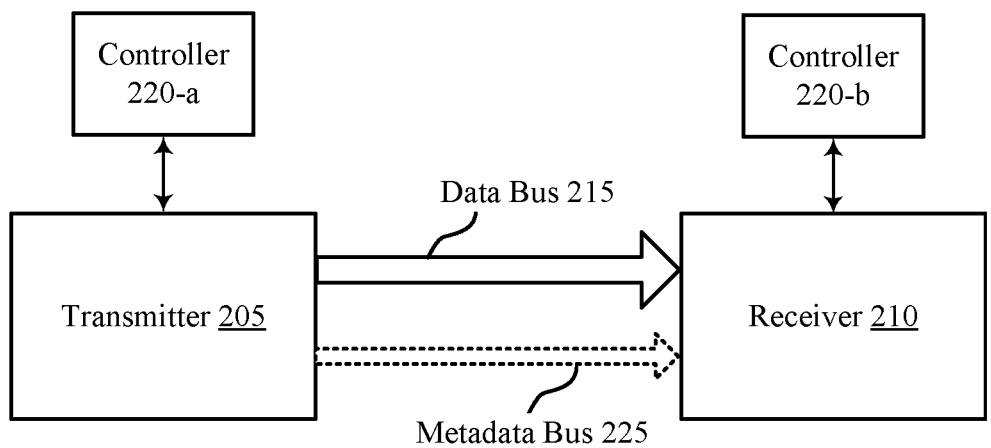
FIGS. 2A and 2B illustrate an example of a device and symbol levels that supports a replacement scheme for a PAM bus in accordance with examples as disclosed herein.
Figure 2B:
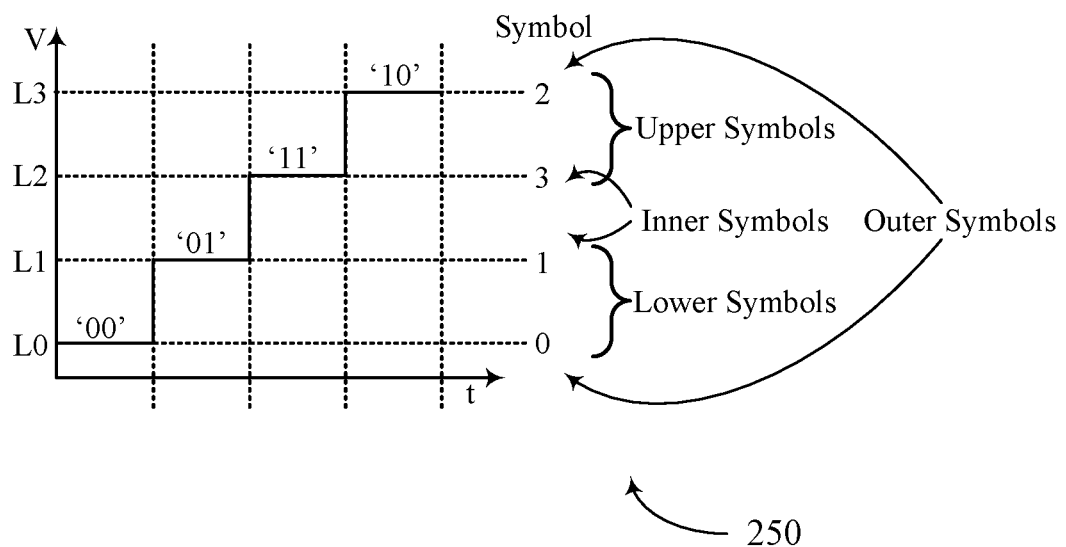

FIG. 2A illustrates an example of a device 200 and FIG. 2B illustrates symbol levels 250 that support a replacement scheme for a PAM bus in accordance with examples as disclosed herein. The device 200 may be an example of a system 100, as described with reference to FIG. 1; however, device 200 is not limited to the illustrative systems and devices described herein. The device 200 may use a multi-level modulation scheme (e.g., PAM4) that includes symbol levels 250. The device 200 may implement a replacement scheme as described herein so that the quantity of transmitted symbols associated with one or more of high cross current or high termination current—relative to other symbols—is reduced.

The device 200 may include a transmitter 205 and a receiver 210. The transmitter 205 may be configured to transmit (e.g., drive, output) data symbols over data bus 215. The data symbols may be modulated according to a modulation scheme, such as a PAM scheme, and may be based on data bits received from another component (e.g., a data buffer) coupled with the transmitter 205. The transmitter 205 may also be configured to transmit metadata symbols, such as a DBR symbol, over the data bus 215 and/or over the metadata bus 225. The transmitter 205 may be controlled by controller 220-a (e.g., via various control signals). Although shown coupled with the transmitter 205, controller 220-a may, in some examples, be included in transmitter 205, or vice versa. Before transmitting a set of data, the transmitter 205 may perform various symbol replacements as described herein, which may improve the performance of the device 200.

The receiver 210 may be configured to receive data symbols over data bus 215 and to receive metadata symbols over one or more of the data bus 215 or the metadata bus 225. The receiver 210 may also be configured to undo any replacements made at the transmitter 205 so that the original set of data can be restored. In some examples, the transmitter 205 is included in a host device 105 and the receiver is included in a memory device 110. In some examples, the transmitter 205 is included in a memory device 110 and the receiver is included in a host device 105. In some examples, one or both of the transmitter 205 or the receiver 210 may be included in a respective transceiver (e.g., a component with transmission and reception functionality).

The symbol levels 250 may represent the relative voltage levels of different PAM4 symbols used by device 200. Thus, the symbol levels 240 may include four symbol (voltage) levels (denoted L0, L1, L2, and L3) each associated with a respective symbol (denoted 0 through 3), and, in PAM4, each symbol may represent two bits (e.g., a most-significant bit (MSB) and a least-significant bit (LSB)). For example, symbol level L0 may be associated with (or "correspond to") symbol 0, which may represent bits '00;' symbol level L1 may be associated with symbol 1, which may represent bits '01;' symbol level L2 may be associated with symbol 3, which may represent bits '11;' and symbol level L3 may be associated with symbol 2, which may represent bits '10.' The mapping between bit values and symbols/symbol levels may be an example of grey coding, which is a type of coding that ensures that a single bit changes per incremental change in decimal value. Although described with reference to voltage levels, in some implementations the symbols may also be represented by current levels.

For ease of reference certain combinations of symbols may be referred to based on their characteristics or relation to other symbols. For example, symbol 2 and symbol 3 may be referred to as "high" or "upper" symbols because they have the relatively highest symbol levels; whereas symbol 0 and symbol 1 may be referred to as "low" or "lower" symbols because they have the relatively lowest symbol levels. Additionally or alternatively, symbol 1 and symbol 3 may be referred to as "inner" or "intermediate" symbols because their symbol levels are between the symbol levels for symbol 0 and symbol 2; and symbol 0 and symbol 2 may be referred to as "outer" symbols because their symbol levels are the relatively outermost symbol levels.

Due to the configuration of the device 200, some of the symbol levels may be associated with adverse electrical phenomena. For example, generation and/or transmission of the inner symbols (e.g., symbol 1 and symbol 3) may be associated with increased cross current relative to the other symbols. Cross current may refer to direct pull-up to pull-down current inside a driver (e.g., a PAM4 driver), where pull-up refers to a pull-up circuit and pull down refers to a pull-down circuit. And generation and/or transmission of the lower symbols (e.g., symbol 0 and symbol 1) may be associated with increased termination current relative to other symbols. So, each symbol except for symbol 2 may be associated with at least one deleterious electrical phenomenon. To reduce the cross current and the termination current associated with a data set, device 200 may strategically replace (e.g., before transmission) symbols in the data set so that the quantity of 2s in the data set is increased or maximized.

Figure 3:
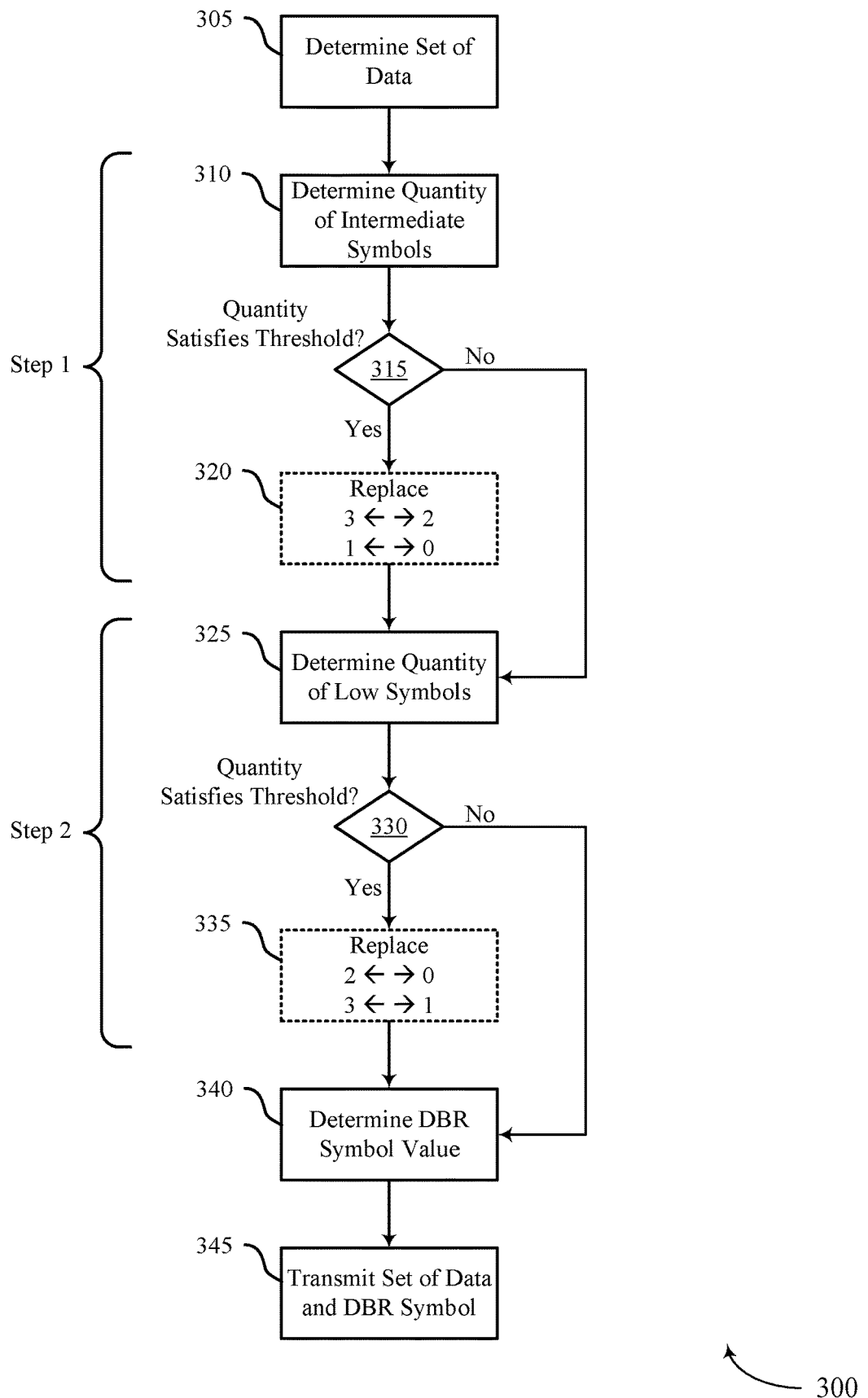
FIG. 3 illustrates an example of a process flow that supports a replacement scheme for a PAM bus in accordance with examples as disclosed herein.

FIG. 3 illustrates an example of a process flow 300 that supports a replacement scheme for a PAM bus in accordance with examples as disclosed herein. The process flow 300 may illustrate aspects of a replacement scheme as described herein and may be implemented by a device such as the device 200 described with reference to FIG. 2. A transmitter or transceiver of the device may implement the process flow 300 to reduce the quantity of symbols (in a transmitted data set) that are associated with deleterious current phenomenon (e.g., high termination current, high cross current).

Process flow 300 may include example operations in Step 1 and operations in Step 2, among other operations. As a summary, in Step 1, the device may replace the intermediate symbols (e.g., the inner symbols, 1 and 3, which are associated with increased cross-current) in a data set with one or more other symbols. In Step 2, the device may replace the lower symbols (e.g., symbols 0 and 1, which associated with increased termination current) in the data set with one or more other symbols. By performing Step 1 and Step 2, as applicable, the device may increase the quantity of 2s in the data set, and in doing so decrease (relative to other schemes) the cross current and the termination current associated with transmitting the data set. Step 1 and Step 2 may also be referred to as stages, phases, modes, or other suitable terminology. Although shown with Step 1 preceding Step 2, Step 2 may in some examples precede Step 1 without loss of functionality (e.g., the relative order of Step 1 and Step 2 may be switched). Additionally or alternatively, at least some part of Step 1 may be performed before or concurrently with performing at least some part of Step 2. Additionally or alternatively, at least some part of Step 2 may be performed before or concurrently with performing at least some part of Step 1.

At 305, the device may determine a set of data for transmission. In some examples, determining the set of data may include receiving a signal indicative of the set of data at the transmitter and then determining (e.g., performing analysis on the signal) one or more aspects based on or from the signal, or detecting a set of buffered data.

At 310, the device may determine the quantity of intermediate symbols (e.g., 1s, 3s) in the data set. Put another way, the device may have one or more components (e.g., circuitry) configured to determine the quantity of symbols associated with relatively high cross-current (compared to other symbols). For example, the device may determine one or both of a first quantity of symbols (e.g., n 1s) associated with the first intermediate level (e.g., L1) of the multi-level modulation scheme or a second quantity of symbols (e.g., m 3s) associated with the second intermediate level (e.g., L2) of the multi-level modulation scheme. The device may determine the quantity of intermediate symbols based on the sum of the first quantity and the second quantity (e.g., n+m).

At 315, the device may determine whether the quantity of intermediate symbols satisfies (e.g., meets, exceeds) a threshold quantity. In some examples, the threshold quantity is equal to half of the symbols in the data set. For example, if the data set comprises eight symbols (e.g., a byte of symbols), the threshold quantity may be four. The operations at 315 may allow the device to determine whether the quantity of intermediate symbols present in the data set justifies replacement. If, at 315, the device determines that the quantity of intermediate symbols does not satisfy the threshold quantity, the device may by-pass 320 and proceed to 325. Thus, the device may avoid replacing the intermediate symbols when doing so would be disadvantageous (e.g., because the replacements would increase, rather than decrease, the quantity of intermediate symbols). If, at 315, the device determines that the quantity of intermediate symbols satisfies the threshold quantity, the device may proceed to 320. Thus, the device may ensure the quantity of intermediate symbols present in the data set justifies the replacements at 320 (otherwise, the replacements at 320 may increase, rather than decrease, the quantity of intermediate symbols).

At 320, the device may perform one or more symbol replacements in the set of data. For example, the device may replace any quantity (e.g., 0, 1, 2, 3 or more) of symbols (e.g., 1s) corresponding to the first intermediate level (e.g., L1) with respective symbols (e.g., 0s) corresponding to the lowest level (e.g., L0), and vice versa. The device may also replace any symbols (e.g., 3s) corresponding to the second intermediate level (e.g., L2) with respective symbols (e.g., 2s) corresponding to the highest level (e.g., L3), and vice versa. Thus, the device may reduce the quantity of symbols associated with relatively high cross-current (compared to other symbols). It should be appreciated that due to the present techniques and related advantages, along with the strategic nature of the replacements performed at 320, the overall quantity of upper symbols may be maintained, and the overall quantity of lower symbols may be maintained (relative to the original data set).

In some examples, the replacements performed at 320 may also be referred to exchanges or inversions, among other suitable terminology. Some or all of the replacements at 320 may be performed concurrently (e.g., during partially or wholly overlapping time periods) or serially (e.g., at non-overlapping time periods). Further, replacement of a symbol may be accomplished by modifying a signal indicative of the set of data. For example, to replace a 0 symbol with a 1 symbol, the signal may be modified by boosting the voltage of the signal (for that symbol) by the difference between L0 and L1. Put another way, a replacement at 320 may include inverting the least significant bit of a symbol (e.g., while the most significant bit is maintained).

At 325, the device may determine the quantity of low symbols (e.g., 0s, 1s) in the data set. Put another way, the device may determine the quantity of symbols associated with relatively high termination current (compared to other symbols). For example, the device may determine a third quantity of symbols (e.g., x 0s) associated with the lowest level (e.g., L0) of the multi-level modulation scheme and a fourth quantity of symbols (e.g., y 1s) associated with the second lowest level (e.g., L1, also referred to as the first intermediate level) of the multi-level modulation scheme. The device may determine the quantity of low symbols based on the sum of the third quantity and the fourth quantity (e.g., x+y). As illustrated by process flow 300, the determination at 325 may occur after any replacements performed at 320 and thus may account for or reflect those replacements.

At 330, the device may determine whether the quantity of low symbols satisfies (e.g., meets, exceeds) a threshold quantity. In some examples, the threshold quantity is equal to half of the symbols in the data set. For example, if the data set comprises eight symbols (e.g., a byte of symbols), the threshold quantity may be four. The operations at 330 may allow the device to determine whether the quantity of low symbols present in the data set justifies replacement. If, at 330, the device determines that the quantity of low symbols does not satisfy the threshold quantity, the device may by-pass 335 and proceed to 340. Thus, the device may avoid replacing the low symbols when doing so would be disadvantageous (e.g., because the replacements would increase, rather than decrease, the quantity of low symbols). If, at 330, the device determines that the quantity of low symbols satisfies the threshold quantity, the device may proceed to 335. Thus, the device may ensure the quantity of low symbols present in the data set justifies the replacements at 335 (otherwise, the replacements at 335 may increase, rather than decrease, the quantity of low symbols).

At 335, the device may perform one or more symbol replacements in the set of data. For example, the device may replace any symbols (e.g., 0s) corresponding to the lowest level (e.g., L0) with respective symbols (e.g., 2s) corresponding to the highest level (e.g., L3), and vice versa. The device may also replace any symbols (e.g., 1s) corresponding to the second lowest level (e.g., L1) with respective symbols (e.g., 3s) corresponding to the second highest level (e.g., L2, also referred to as the second intermediate level), and vice versa. Thus, the device may reduce the quantity of symbols associated with relatively high termination current (compared to other symbols). It should be appreciated that due to the strategic nature of the replacements performed at 335, the quantity of inner symbols is maintained, and the quantity of outer symbols is maintained (relative to the data set existing immediately before 335). Some or all of the replacements at 335 may be performed concurrently (e.g., during partially or wholly overlapping time periods) or serially (e.g., at non-overlapping time periods). It should be appreciated that a replacement at 335 may include inverting the most significant bit of a symbol (e.g., while the least significant bit is maintained).

At 340, the device may determine a value for a metadata symbol (e.g., a DBR symbol) that represents the replacement scheme implemented by the device for the data set. The device may determine the value for the metadata symbol based on the replacements, if any, performed at 320 and 335. An example of metadata values and corresponding replacement schemes is provided by Table 1.

Table 1

Mapping of Metadata Symbol Values to Replacement Schemes

| DBR Value | Replacement Scheme | Step 1 Replacement | Step 2 Replacement |
|---|---|---|---|
| 0 ('00') | A | Not performed | Not performed |
| 1 ('01') | B | Performed | Not performed |
| 3 ('10') | C | Not performed | Performed |
| 2 ('11') | D | Performed | Performed |

The MSB of the DBR symbol may, in some examples, indicate whether a Step 1 replacement was performed and the LSB of the DBR symbol may, in some examples, indicate whether a Step 2 replacement was performed. So, in Table 1, a DBR symbol value of 0 is associated with Replacement Scheme A, in which no replacements in Step 1 or Step 2 replacements are performed; a DBR symbol value of 1 is associated with Replacement Scheme B, in which at least one Step 1 replacement is performed and no Step 2 replacements are performed; a DBR symbol value of 3 is associated with Replacement Scheme C, in which no Step 1 replacements are performed and at least one Step 2 replacement is performed; and a DBR symbol value of 2 is associated with Replacement Scheme D, in which at least one Step 1 replacement is performed and at least one Step 2 replacement is performed.

At 345, the device may transmit the set of data and the DBR symbol associated with the set of data. The device may transmit the set of data over a data bus. The device may transmit the DBR symbol over the data bus or a different bus (e.g., a metadata bus). The DBR symbol may be transmitted concurrently with at least a portion of the set of data or at a different time than the set of data (e.g., the DBR symbol may precede the set of data or follow the set of data). Thus, the device may implement the process flow 300 to reduce the quantity of symbols in a data set associated with adverse current phenomenon (e.g., high termination current, high cross current).

Alternative examples of the process flow 300 may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 4:
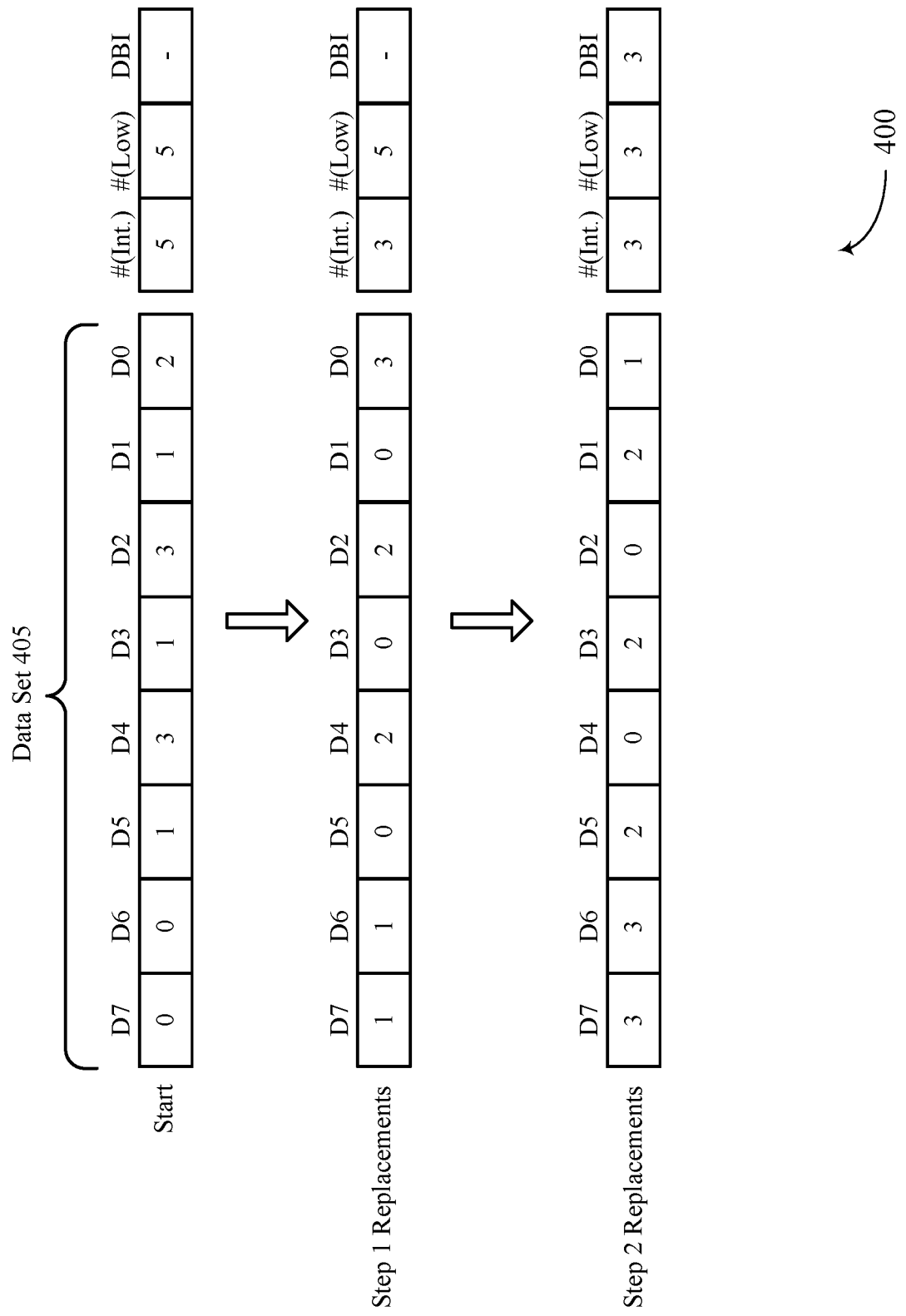
FIG. 4 illustrates an example of replacement operations that support a replacement scheme for a PAM bus in accordance with examples as disclosed herein.

FIG. 4 illustrates an example of replacement operations 400 that support a replacement scheme for a PAM bus in accordance with examples as disclosed herein. The replacement operations 400 may illustrate aspects of a replacement scheme as described herein and may be implemented by a device such as the device 200 described with reference to FIG. 2. So, the device may perform the replacement operations 400 to reduce the quantity of symbols in a data set associated with deleterious current phenomenon (e.g., high termination current, high cross current).

The replacement operations 400 may be an example of replacement operations performed by a device in accordance with Replacement Scheme D, as described with reference to Table 1. Thus, the replacement operations 400 may include Step 1 replacements and Step 2 replacements. Although shown with Step 1 preceding Step 2, in some examples, Step 2 may precede Step 1 without loss of functionality (e.g., the relative order of Step 1 and Step 2 may be switched). Additionally or alternatively, at least some part of Step 1 may be performed before or concurrently with performing at least some part of Step 2. Additionally or alternatively, at least some part of Step 2 may be performed before or concurrently with performing at least some part of Step 1. The replacement operations 400 may be described with reference to data set 405, which may include eight data symbols denoted D0 through D7. Further, the threshold quantity for determining whether to perform Step 1 or Step 2 replacements may be equal to four.

To begin the replacement process, the device may determine the quantity of intermediate symbols (e.g., 1s and 3s) in data set 405, for example, because these symbols are associated with relatively high cross-current. Based on determining that the data set 405 has five intermediate symbols (e.g., three 1s and two 3s), which is greater than the threshold value of four, the device may determine to perform Step 1 replacements. To perform Step 1 replacements, the device may replace each 1 symbol with a respective 0 symbol and each 0 symbol with a respective 1 symbol. The device may also replace each 3 symbol with a respective 2 symbol and each 2 symbol with a respective 3 symbol. So, is may be replaced by 0s, 0s may be replaced by 1s, 3s may be replaced by 2s, and 2s may be replaced by 3s, which may reduce the quantity of symbols (e.g., 1s and 3s) associated with relatively high cross-current. After performing the Step 1 replacements, the device may determine the resulting quantity of low symbols (e.g., 0s and 1s) in data set 405, because these symbols are associated with relatively high termination current. Upon determining that the data set 405 has five low symbols (e.g., three 0s and two 1s), which is greater than the threshold value of four, the device may determine to perform Step 2 replacements.

To perform Step 2 replacements, the device may replace each 0 symbol with a respective 2 symbol and each 2 symbol with a respective 0 symbol. The device may also replace each 1 symbol with a respective 3 symbol and each 3 symbol with a respective 1 symbol. So, 0s may be replaced by 2s, 2s may be replaced by 0s, is may be replaced by 3s, and 3s may be replaced by 2s, which may reduce the quantity of symbols (e.g., 0s and 1s) associated with high termination current. The result of the Step 1 and Step 2 replacements may be a data set that has a reduced quantity of symbols associated with relatively high termination current and relatively high cross current.

Although described as occurring serially, the Step 1 replacements and Step 2 replacements may be performed concurrent (e.g., in parallel, at least partially overlapping). Additionally or alternatively, the device perform some of the replacements logically (e.g., at a processor) and others physically (e.g., via signal modification). For example, with respect to FIG. 4, the device may predict (e.g., by performing the replacements logically) the end result of performing Step 1 and Step 2 and perform a single round of (physical) replacements in which 0s are replaced with 3s, is are replaced with 2s, 2s are replaced with 1s, and 3s are replaced with 0s. That is, the device may replace each symbol D0 through D7 once, instead of twice (e.g., the 0 of data symbol D7 may be directly replaced with a 3, rather than being temporarily replaced with a 1). Put another way, there may be a single replacement step instead of two replacement steps. Thus, the device may reduce the quantity of replacements that are performed, which may save time and power, among other advantages.

Figure 5:
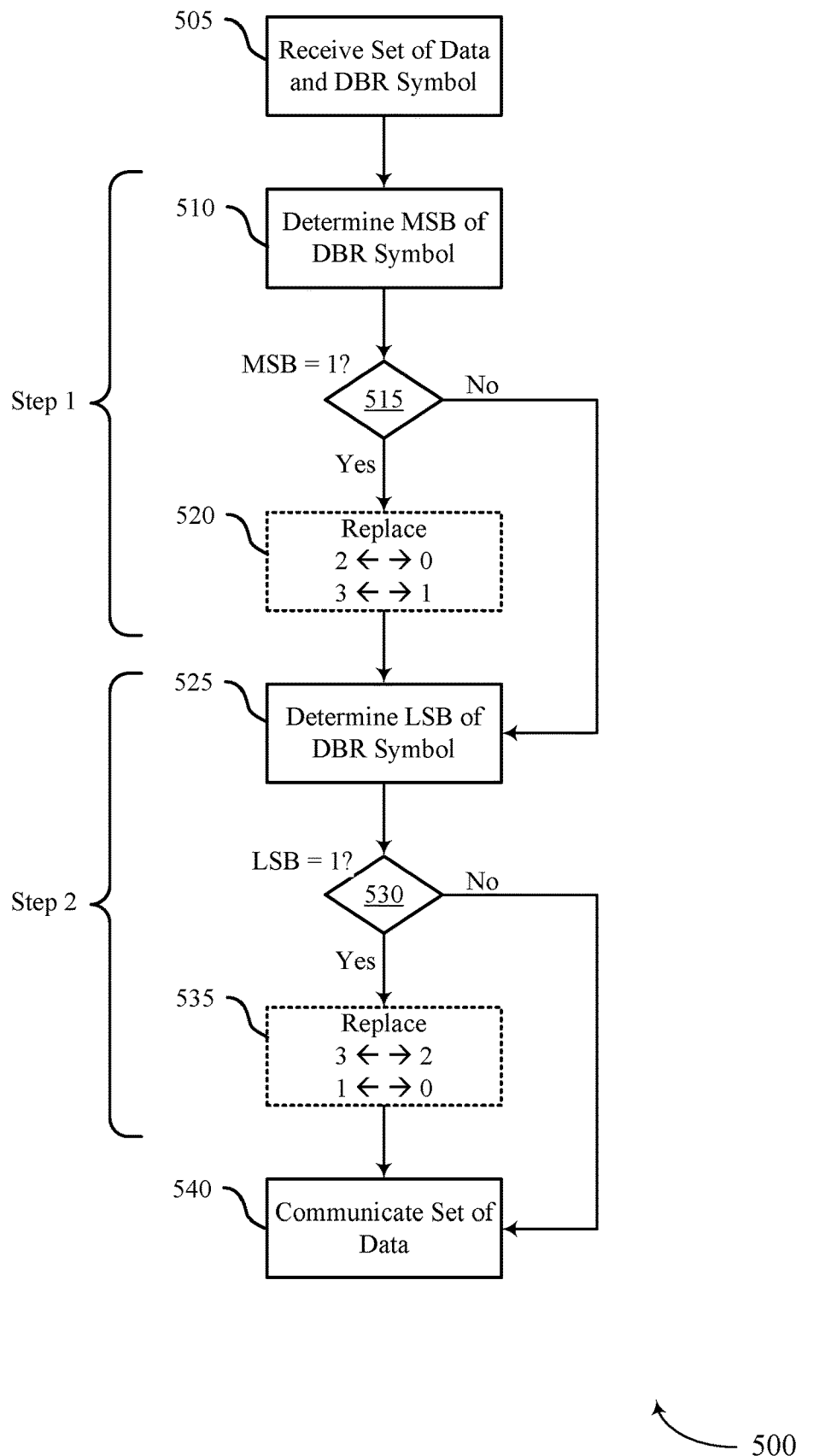
FIG. 5 illustrates an example of a process flow that supports a replacement scheme for a PAM bus in accordance with examples as disclosed herein.

FIG. 5 illustrates an example of a process flow 500 that supports a replacement scheme for a PAM bus in accordance with examples as disclosed herein. The process flow 500 may illustrate aspects of a replacement scheme as described herein and may be implemented by a device such as the device 200 described with reference to FIG. 2. A receiver of the device may perform the process flow 500 to restore the original content of a set of data that was subject to a replacement scheme as described herein. Restoring the original content of a set of data may also be referred to as decoding the set of data.

Process flow 500 may include operations in Step 1 and operations in Step 2, among other operations. As a summary, in Step 1, the device may perform symbol replacements that undo any symbol replacements performed in Step 1 by the transmitter (as described with reference to FIGS. 3 and 4). In Step 2, the device may perform symbol replacements that undo any symbol replacements performed in Step 2 by the transmitter (as described with reference to FIGS. 3 and 4). Step 1 and Step 2 may also be referred to as stages, phases, or other suitable terminology. Although shown with Step 1 preceding Step 2, Step 2 may precede Step 1 without loss of functionality (e.g., the relative order of Step 1 and Step 2 may be switched).

At 505, the device may receive a signal indicative of a set of data and a signal indicative of one or more DBR symbols. The signals indicative of the set of data and the DBR symbol(s) may be received over the data bus of over different buses, at overlapping times or at different times. In some examples, the signals indicative of the set of data and the DBR symbol(s) may be received from a transmitter. The DBR symbol may represent two bits, an LSB and an MSB, which collectively may indicate the replacement scheme used by the transmitter. For example, the MSB may indicate whether the transmitter performed Step 1 replacements and the LSB may indicate whether the transmitter performed Step 2 replacements.

At 510, the device may determine a value of the MSB of the DBR symbol. At 515, the device may determine whether the MSB of the DBR symbol is equal to 1. If, at 515, the device determines that the MSB is not equal to 1, the device may by-pass 520 and proceed to 525. Thus, the receiver may avoid performing Step 1 replacements if the transmitter did not perform Step 1 replacements. If, at 515, the device determines that MSB is equal to 1, the device may proceed to 520.

At 520, the device may perform one or more symbol replacements in the set of data based on the MSB of the DBR symbol being equal to 1. For example, the device may replace any symbols (e.g., 1s) associated with the first intermediate level (e.g., L1) with respective symbols (e.g., 0s) associated with the lowest level (e.g., L0), and vice versa. The device may also replace any symbols (e.g., 3s) associated with the second intermediate level (e.g., L2) with respective symbols (e.g., 2s) associated with the highest level (e.g., L3), and vice versa. Thus, the device may undo the Step 1 replacements performed by the transmitter. Some or all of the replacements at 520 may be performed concurrently (e.g., during partially or wholly overlapping time periods) or serially (e.g., at non-overlapping time periods). A replacement at 520 may include inverting the most significant bit of a symbol (e.g., while the least significant bit is maintained).

At 525, the device may determine a value of the LSB of the DBR symbol. At 530, the device may determine whether the LSB of the DBR symbol is equal to 1. If, at 530, the device determines that the LSB is not equal to 1, the device may by-pass 535 and proceed to 540. Thus, the receiver may avoid performing Step 2 replacements if the transmitter did not perform Step 2 replacements. If, at 530, the device determines that LSB is equal to 1, the device may proceed to 535.

At 535, the device may perform one or more symbol replacements in the set of data. For example, the device may replace any symbols (e.g., 0s) corresponding to the lowest level (e.g., L0) with respective symbols (e.g., 2s) corresponding to the highest level (e.g., L3), and vice versa. The device may also replace any symbols (e.g., 1s) corresponding to the second lowest level (e.g., L1) with respective symbols (e.g., 3s) corresponding to the second highest level (e.g., L2, also referred to as the second intermediate level), and vice versa. Thus, the device may undo the Step 2 replacements performed by the transmitter. Some or all of the replacements at 535 may be performed concurrently (e.g., during partially or wholly overlapping time periods) or serially (e.g., at non-overlapping time periods). At 540, the device may process the set of data and/or communicate a signal indicative of the set of data to another component of the device. It should be appreciated that a replacement at 535 may include inverting the least significant bit of a symbol (e.g., while the most significant bit is maintained).

Thus, the device may use strategic symbol replacements to restore the original content of a data set that underwent symbol replacement before transmission. Alternative examples of the process flow 500 may be implemented, where some operations are performed in a different order than described, are performed in parallel, or are not performed at all. In some cases, operations may include additional features not mentioned below, or further operations may be added. Additionally, certain operations may be performed multiple times or certain combinations of operations may repeat or cycle.

Figure 6:
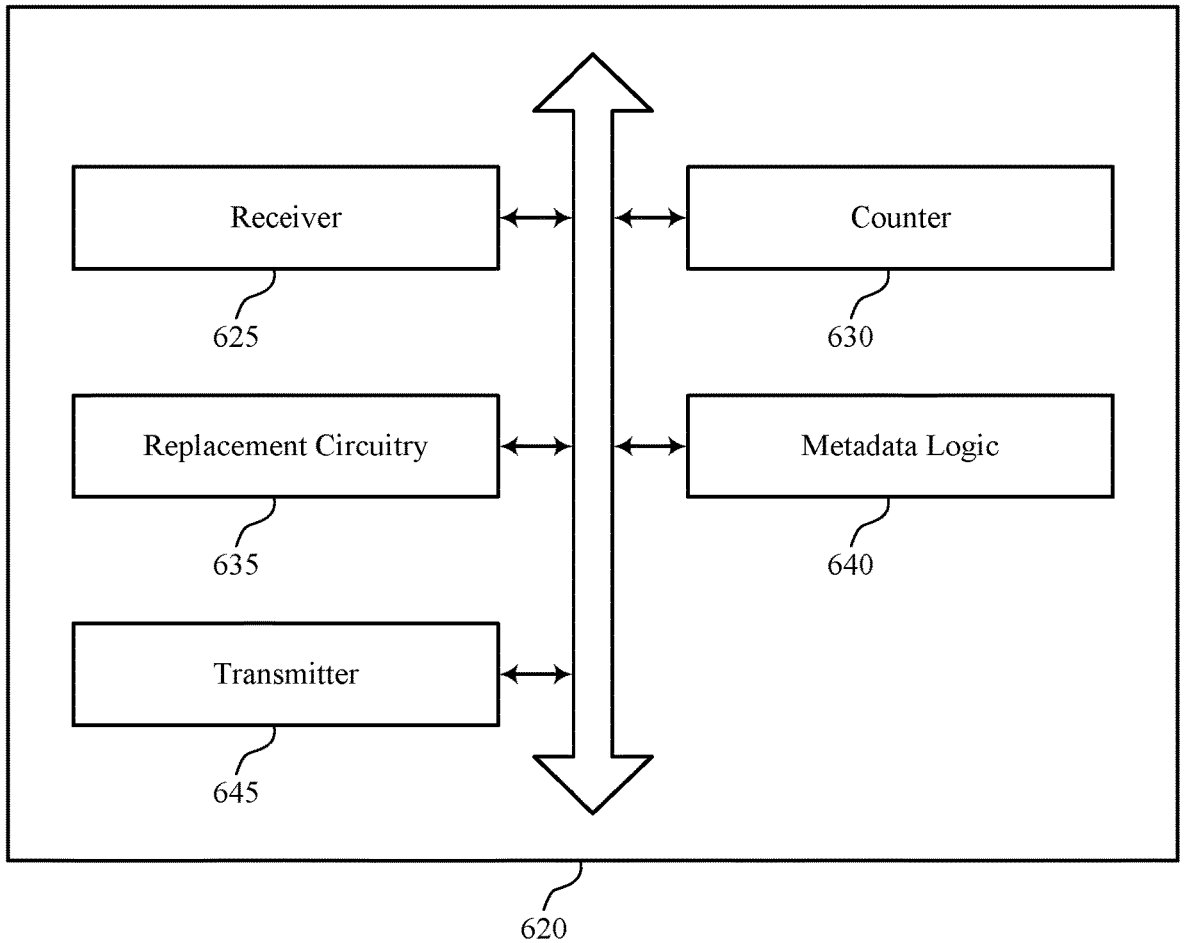
FIG. 6 shows a block diagram of a memory device that supports a replacement scheme for a PAM bus in accordance with examples as disclosed herein.

FIG. 6 shows a block diagram 600 of a device 620 that supports a replacement scheme for a PAM bus in accordance with examples as disclosed herein. The device 620 may be an example of aspects of a device, memory device, or host device as described with reference to FIGS. 1 through 5. The device 620, or various components thereof, may be an example of means for performing various aspects of replacement scheme for a pulse amplitude modulated bus as described herein. For example, the device 620 may include a receiver 625, a counter 630, a replacement circuitry 635, a metadata logic 640, a transmitter 645, or any combination thereof. Each of these components may communicate, directly or indirectly, with one another (e.g., via one or more buses).

The receiver 625 may be configured as or otherwise support a means for receiving a signal indicative of a set of data associated with a multi-level modulation scheme that includes three or more levels. The counter 630 may be configured as or otherwise support a means for determining, based at least in part on the signal, a first quantity of symbols corresponding to a first level of the multi-level modulation scheme and a second quantity of symbols corresponding to a second level of the multi-level modulation scheme. The replacement circuitry 635 may be configured as or otherwise support a means for modifying the signal, based at least in part on a sum of the first quantity and the second quantity satisfying a threshold, to replace one or more of the symbols corresponding to the first level with a respective symbol corresponding to a third level of the multi-level modulation scheme.

In some examples, the replacement circuitry 635 may be configured as or otherwise support a means for modifying the signal, based at least in part on the sum satisfying the threshold, to replace one or more of the symbols corresponding to the third level with a respective symbol corresponding to the first level.

In some examples, the counter 630 may be configured as or otherwise support a means for determining, based at least in part on signal after the replacement, a third quantity of symbols corresponding to the first level and a fourth quantity of symbols corresponding to the third level of the multi-level modulation scheme. In some examples, the replacement circuitry 635 may be configured as or otherwise support a means for modifying the signal, based at least in part on a sum of the third quantity and the fourth quantity satisfying a second threshold, to replace one or more of the symbols corresponding to the third level with a respective symbol corresponding to a fourth level.

In some examples, the counter 630 may be configured as or otherwise support a means for determining, based at least in part on the signal after the replacement, a third quantity of symbols corresponding to the first level and a fourth quantity of symbols corresponding to the third level of the multi-level modulation scheme. In some examples, the replacement circuitry 635 may be configured as or otherwise support a means for modifying the signal, based at least in part on a sum of the third quantity and the fourth quantity satisfying a second threshold, to replace one or more of the symbols corresponding to the first level with a respective symbol corresponding to the second level.

In some examples, the replacement circuitry 635 may be configured as or otherwise support a means for modifying the signal, based at least in part on the sum satisfying the threshold, to replace one or more of the symbols corresponding to the second level with a respective symbol corresponding to a fourth level of the multi-level modulation scheme.

In some examples, the replacement circuitry 635 may be configured as or otherwise support a means for modifying the signal, based at least in part on the sum satisfying the threshold, to replace one or more of the symbols corresponding to the fourth level with a respective symbol corresponding to the second level of the multi-level modulation scheme.

In some examples, the metadata logic 640 may be configured as or otherwise support a means for determining a value for a metadata symbol based at least in part on the replacement, the value associated with a scheme for replacement for the set of data. In some examples, the transmitter 645 may be configured as or otherwise support a means for transmitting the metadata symbol and the signal indicative of the set of data after performing the replacement and based at least in part on determining the value associated with the scheme for replacement.

In some examples, the first level includes a first intermediate level of the multi-level modulation scheme and the second level includes a second intermediate level of the multi-level modulation scheme. In some examples, the first level includes a lowest level of the multi-level modulation scheme and the second level includes an intermediate level of the multi-level modulation scheme.

In some examples, the receiver 625 may be configured as or otherwise support a means for receiving a signal indicative of a set of data associated with a multi-level modulation scheme that includes at least three levels. In some examples, the counter 630 may be configured as or otherwise support a means for determining, based at least in part on the signal, a first quantity of symbols corresponding to a first intermediate level of the multi-level modulation scheme and a second quantity of symbols corresponding to a second intermediate level of the multi-level modulation scheme. In some examples, the replacement circuitry 635 may be configured as or otherwise support a means for modifying the signal, based at least in part on a sum of the first quantity and the second quantity satisfying a threshold, to replace one or more of the symbols corresponding to the first intermediate level with a respective symbol corresponding to a lowest level of the multi-level modulation scheme. In some examples, the replacement circuitry 635 may be configured as or otherwise support a means for modifying the signal, based at least in part on the sum satisfying the threshold, to replace one or more of the symbols corresponding to the second intermediate level with a respective symbol corresponding to a highest level of the multi-level modulation scheme.

In some examples, the counter 630 may be configured as or otherwise support a means for determining, based at least in part on the signal after the replacement, a third quantity of symbols corresponding to the lowest level and a fourth quantity of symbols corresponding to the first intermediate level of the multi-level modulation scheme. In some examples, the replacement circuitry 635 may be configured as or otherwise support a means for modifying the signal, based at least in part on a sum of the third quantity and the fourth quantity satisfying a second threshold, to replace one or more symbols corresponding to the lowest level with a respective symbol corresponding to the highest level.

In some examples, the counter 630 may be configured as or otherwise support a means for determining, based at least in part on the signal after the replacement, a third quantity of symbols corresponding to the lowest level and a fourth quantity of symbols corresponding to the first intermediate level of the multi-level modulation scheme. In some examples, the replacement circuitry 635 may be configured as or otherwise support a means for modifying the signal, based at least in part on a sum of the third quantity and the fourth quantity satisfying a second threshold, to replace one or more symbols corresponding to the first intermediate level with a respective symbol corresponding to the second intermediate level.

Figure 7:
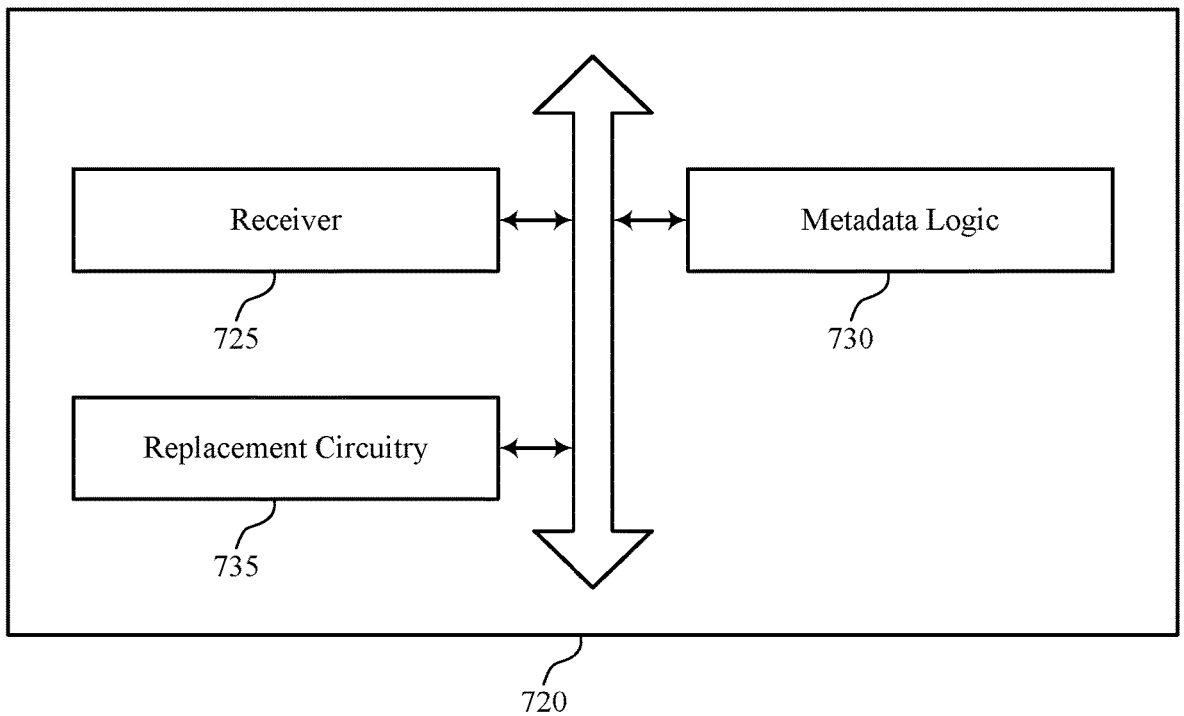
FIG. 7 shows a block diagram of a host device that supports a replacement scheme for a PAM bus in accordance with examples as disclosed herein.

FIG. 7 shows a block diagram 700 of a device 720 that supports a replacement scheme for a PAM bus in accordance with examples as disclosed herein. The device 720 may be an example of aspects of a device, memory device, or host device as described with reference to FIGS. 1 through 5. The device 720, or various components thereof, may be an example of means for performing various aspects of replacement scheme for a pulse amplitude modulated bus as described herein. For example, the device 720 may include a receiver 725, a metadata logic 730, a replacement circuitry 735, or any combination thereof. Each of these components may communicate, directly or indirectly, with one another (e.g., via one or more buses).

The receiver 725 may be configured as or otherwise support a means for receiving, over a data bus, a signal indicative of a set of data associated with a multi-level modulation scheme that includes three or more levels. The metadata logic 730 may be configured as or otherwise support a means for determining a value of a metadata symbol associated with the set of data, where the value of the metadata symbol indicates a scheme for replacement employed by a device that transmitted the set of data. The replacement circuitry 735 may be configured as or otherwise support a means for modifying the signal, based at least in part on the value of the metadata symbol, to replace one or more symbols corresponding to a first level of the multi-level modulation scheme with a respective symbol corresponding to a second level of the multi-level modulation scheme.

In some examples, the replacement circuitry 735 may be configured as or otherwise support a means for modifying, based at least in part on the value of the metadata symbol, to replace one or more symbols corresponding to the second level with a respective symbol corresponding to the first level.

In some examples, the replacement circuitry 735 may be configured as or otherwise support a means for modifying, based at least in part on the value of the metadata symbol, to replace one or more symbols corresponding to a third level of the multi-level modulation scheme with a respective symbol corresponding to a fourth level of the multi-level modulation scheme.

In some examples, the replacement circuitry 735 may be configured as or otherwise support a means for modifying, based at least in part on the value of the metadata symbol, to replace one or more symbols corresponding to the fourth level of the multi-level modulation scheme with a respective symbol corresponding to the third level of the multi-level modulation scheme.

In some examples, the replacement circuitry 735 may be configured as or otherwise support a means for modifying, after the replacement and based at least in part on the value of the metadata symbol, to replace one or more symbols corresponding to the second level with a respective symbol corresponding to a third level of the multi-level modulation scheme.

In some examples, the receiver 725 may be configured as or otherwise support a means for receiving a signal indicative of the metadata symbol from the device that transmitted the signal indicative of the set of data.

In some examples, the first level includes an intermediate level of the multi-level modulation scheme and the second level includes a lowest level of the multi-level modulation scheme. In some examples, the first level includes a lowest level of the multi-level modulation scheme and the second level includes a highest level of the multi-level modulation scheme.

Figure 8:
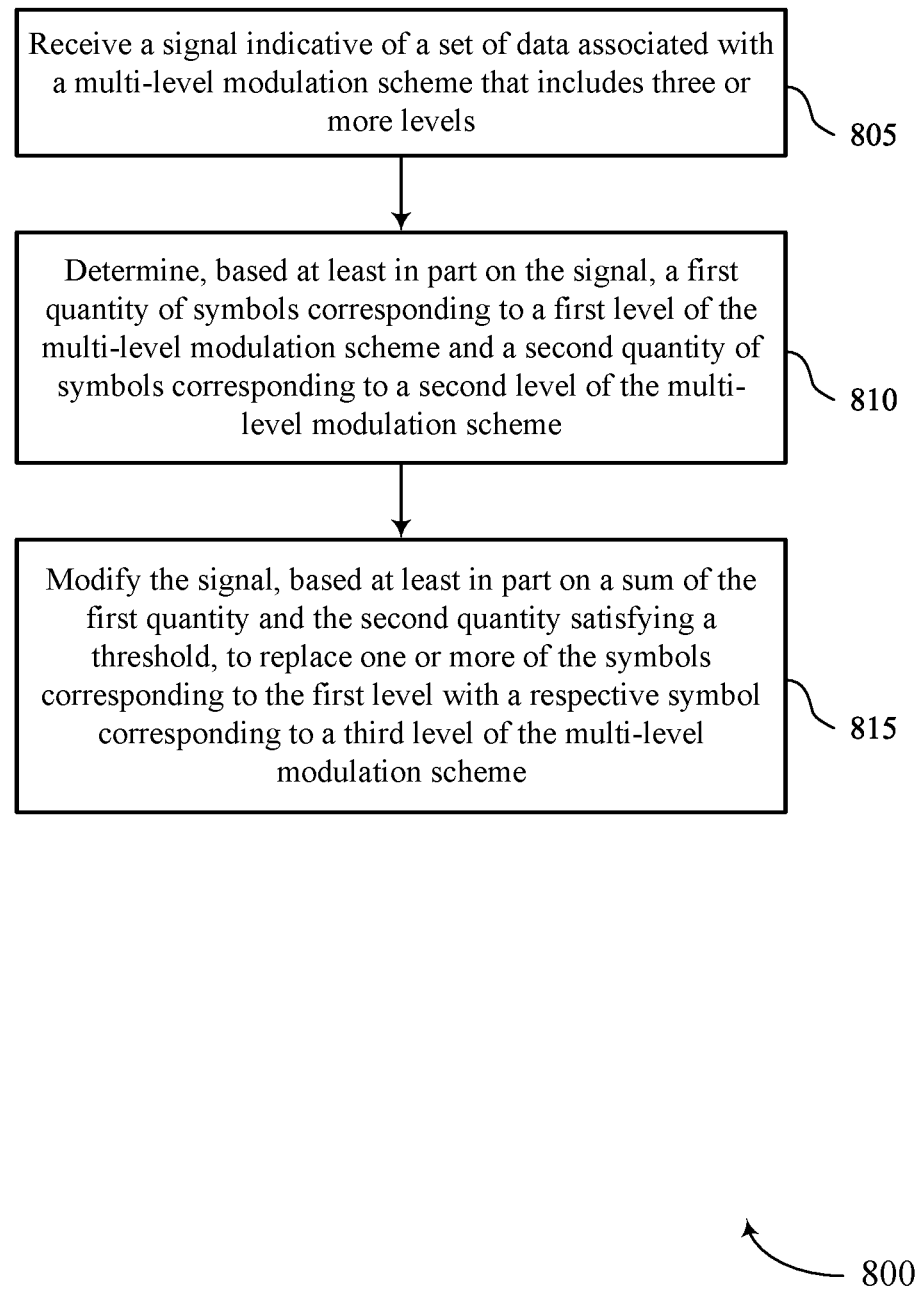
FIGS. 8 through 10 show flowcharts illustrating a method or methods that support a replacement scheme for a PAM bus in accordance with examples as disclosed herein.

FIG. 8 shows a flowchart illustrating a method 800 that supports a replacement scheme for a PAM in accordance with examples as disclosed herein. The operations of method 800 may be implemented by a memory device or its components as described herein. For example, the operations of method 800 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 805, the method may include receiving a signal indicative of a set of data associated with a multi-level modulation scheme that includes three or more levels. The operations of 805 may be performed in accordance with examples as disclosed herein. In some examples, aspects of the operations of 805 may be performed by a receiver 625 as described with reference to FIG. 6.

At 810, the method may include determining, based at least in part on the signal, a first quantity of symbols corresponding to a first level of the multi-level modulation scheme and a second quantity of symbols corresponding to a second level of the multi-level modulation scheme. The operations of 810 may be performed in accordance with examples as disclosed herein. In some examples, aspects of the operations of 810 may be performed by a counter 630 as described with reference to FIG. 6.

At 815, the method may include modifying the signal, based at least in part on a sum of the first quantity and the second quantity satisfying a threshold, to replace one or more of the symbols corresponding to the first level with a respective symbol corresponding to a third level of the multi-level modulation scheme. The operations of 815 may be performed in accordance with examples as disclosed herein. In some examples, aspects of the operations of 815 may be performed by a replacement circuitry 635 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for receiving a signal indicative of a set of data associated with a multi-level modulation scheme that includes three or more levels, determining, based at least in part on the signal, a first quantity of symbols corresponding to a first level of the multi-level modulation scheme and a second quantity of symbols corresponding to a second level of the multi-level modulation scheme, and modifying the signal, based at least in part on a sum of the first quantity and the second quantity satisfying a threshold, to replace one or more of the symbols corresponding to the first level with a respective symbol corresponding to a third level of the multi-level modulation scheme.

Some examples of the method 800 and the apparatus described herein may further include operations, features, circuitry, logic, means, or instructions for modifying the signal, based at least in part on the sum satisfying the threshold, to replace one or more of the symbols corresponding to the third level with a respective symbol corresponding to the first level.

Some examples of the method 800 and the apparatus described herein may further include operations, features, circuitry, logic, means, or instructions for determining, based at least in part on signal after the replacement, a third quantity of symbols corresponding to the first level and a fourth quantity of symbols corresponding to the third level of the multi-level modulation scheme and modifying the signal, based at least in part on a sum of the third quantity and the fourth quantity satisfying a second threshold, to replace one or more of the symbols corresponding to the third level with a respective symbol corresponding to a fourth level.

Some examples of the method 800 and the apparatus described herein may further include operations, features, circuitry, logic, means, or instructions for determining, based at least in part on the signal after the replacement, a third quantity of symbols corresponding to the first level and a fourth quantity of symbols corresponding to the third level of the multi-level modulation scheme and modifying the signal, based at least in part on a sum of the third quantity and the fourth quantity satisfying a second threshold, to replace one or more of the symbols corresponding to the first level with a respective symbol corresponding to the second level.

Some examples of the method 800 and the apparatus described herein may further include operations, features, circuitry, logic, means, or instructions for modifying the signal, based at least in part on the sum satisfying the threshold, to replace one or more of the symbols corresponding to the second level with a respective symbol corresponding to a fourth level of the multi-level modulation scheme.

Some examples of the method 800 and the apparatus described herein may further include operations, features, circuitry, logic, means, or instructions for modifying the signal, based at least in part on the sum satisfying the threshold, to replace one or more of the symbols corresponding to the fourth level with a respective symbol corresponding to the second level of the multi-level modulation scheme.

Some examples of the method 800 and the apparatus described herein may further include operations, features, circuitry, logic, means, or instructions for determining a value for a metadata symbol based at least in part on the replacement, the value associated with a scheme for replacement for the set of data and transmitting the metadata symbol and the signal indicative of the set of data after performing the replacement and based at least in part on determining the value associated with the scheme for replacement.

In some examples of the method 800 and the apparatus described herein, the first level includes a first intermediate level of the multi-level modulation scheme and the second level includes a second intermediate level of the multi-level modulation scheme.

In some examples of the method 800 and the apparatus described herein, the first level includes a lowest level of the multi-level modulation scheme and the second level includes an intermediate level of the multi-level modulation scheme.

Figure 9:
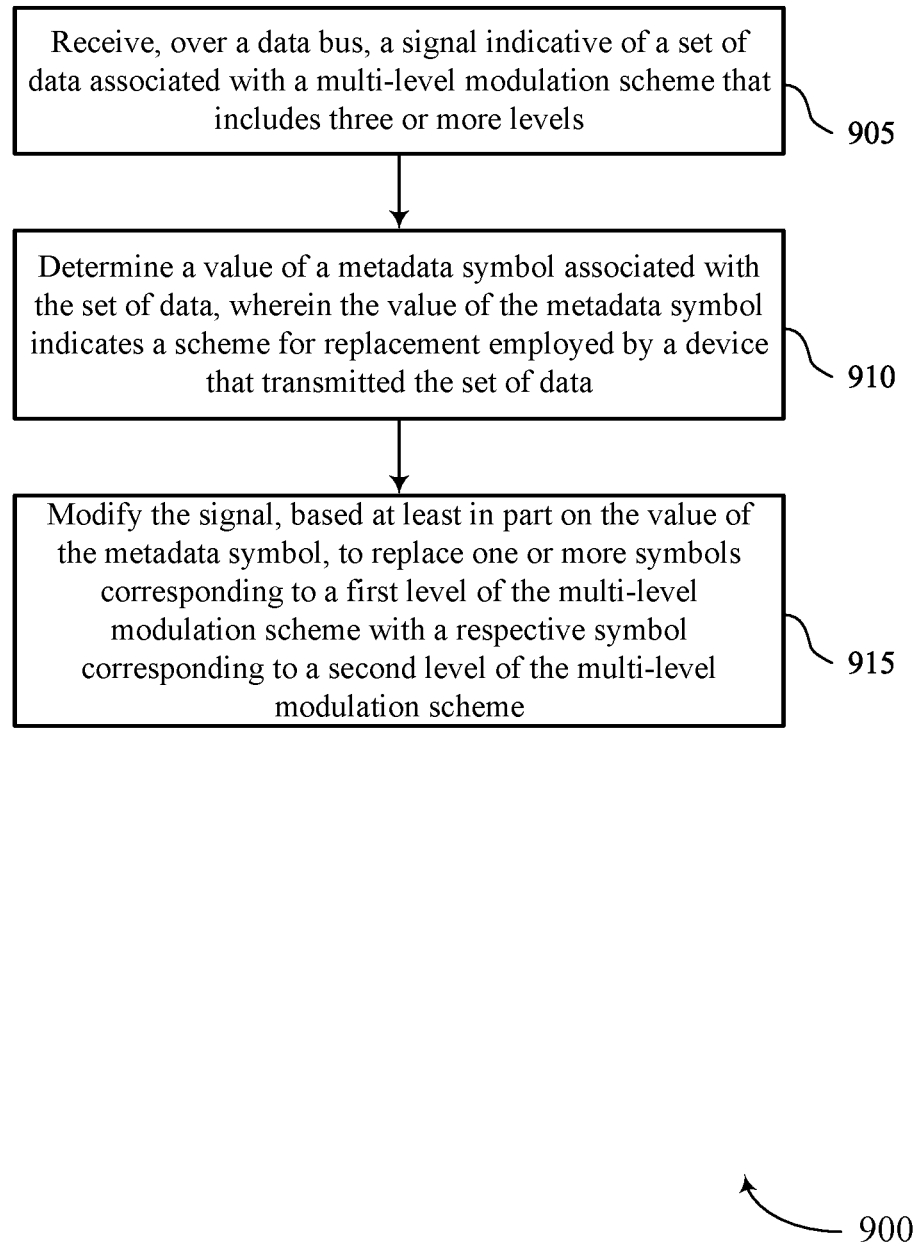

FIG. 9 shows a flowchart illustrating a method 900 that supports a replacement scheme for a PAM bus in accordance with examples as disclosed herein. The operations of method 900 may be implemented by a host device or its components as described herein. For example, the operations of method 900 may be performed by a host device as described with reference to FIGS. 1 through 5 and 7. In some examples, a host device may execute a set of instructions to control the functional elements of the device to perform the described functions. Additionally or alternatively, the host device may perform aspects of the described functions using special-purpose hardware.

At 905, the method may include receiving, over a data bus, a signal indicative of a set of data associated with a multi-level modulation scheme that includes three or more levels. The operations of 905 may be performed in accordance with examples as disclosed herein. In some examples, aspects of the operations of 905 may be performed by a receiver 725 as described with reference to FIG. 7.

At 910, the method may include determining a value of a metadata symbol associated with the set of data, where the value of the metadata symbol indicates a scheme for replacement employed by a device that transmitted the set of data. The operations of 910 may be performed in accordance with examples as disclosed herein. In some examples, aspects of the operations of 910 may be performed by a metadata logic 730 as described with reference to FIG. 7.

At 915, the method may include modifying the signal, based at least in part on the value of the metadata symbol, to replace one or more symbols corresponding to a first level of the multi-level modulation scheme with a respective symbol corresponding to a second level of the multi-level modulation scheme. The operations of 915 may be performed in accordance with examples as disclosed herein. In some examples, aspects of the operations of 915 may be performed by a replacement circuitry 735 as described with reference to FIG. 7.

In some examples, an apparatus as described herein may perform a method or methods, such as the method 900. The apparatus may include, features, circuitry, logic, means, or instructions (e.g., a non-transitory computer-readable medium storing instructions executable by a processor) for receiving, over a data bus, a signal indicative of a set of data associated with a multi-level modulation scheme that includes three or more levels, determining a value of a metadata symbol associated with the set of data, where the value of the metadata symbol indicates a scheme for replacement employed by a device that transmitted the set of data, and modifying the signal, based at least in part on the value of the metadata symbol, to replace one or more symbols corresponding to a first level of the multi-level modulation scheme with a respective symbol corresponding to a second level of the multi-level modulation scheme.

In some examples of the method 900 and the apparatus described herein, modifying, based at least in part on the value of the metadata symbol, to replace one or more symbols corresponding to the second level with a respective symbol corresponding to the first level.

In some examples of the method 900 and the apparatus described herein, modifying, based at least in part on the value of the metadata symbol, to replace one or more symbols corresponding to a third level of the multi-level modulation scheme with a respective symbol corresponding to a fourth level of the multi-level modulation scheme.

In some examples of the method 900 and the apparatus described herein, modifying, based at least in part on the value of the metadata symbol, to replace one or more symbols corresponding to the fourth level of the multi-level modulation scheme with a respective symbol corresponding to the third level of the multi-level modulation scheme.

In some examples of the method 900 and the apparatus described herein, modifying, after the replacement and based at least in part on the value of the metadata symbol, to replace one or more symbols corresponding to the second level with a respective symbol corresponding to a third level of the multi-level modulation scheme.

Some examples of the method 900 and the apparatus described herein may further include operations, features, circuitry, logic, means, or instructions for receiving a signal indicative of the metadata symbol from the device that transmitted the signal indicative of the set of data.

In some examples of the method 900 and the apparatus described herein, the first level includes an intermediate level of the multi-level modulation scheme and the second level includes a lowest level of the multi-level modulation scheme.

In some examples of the method 900 and the apparatus described herein, the first level includes a lowest level of the multi-level modulation scheme and the second level includes a highest level of the multi-level modulation scheme.

Figure 10:
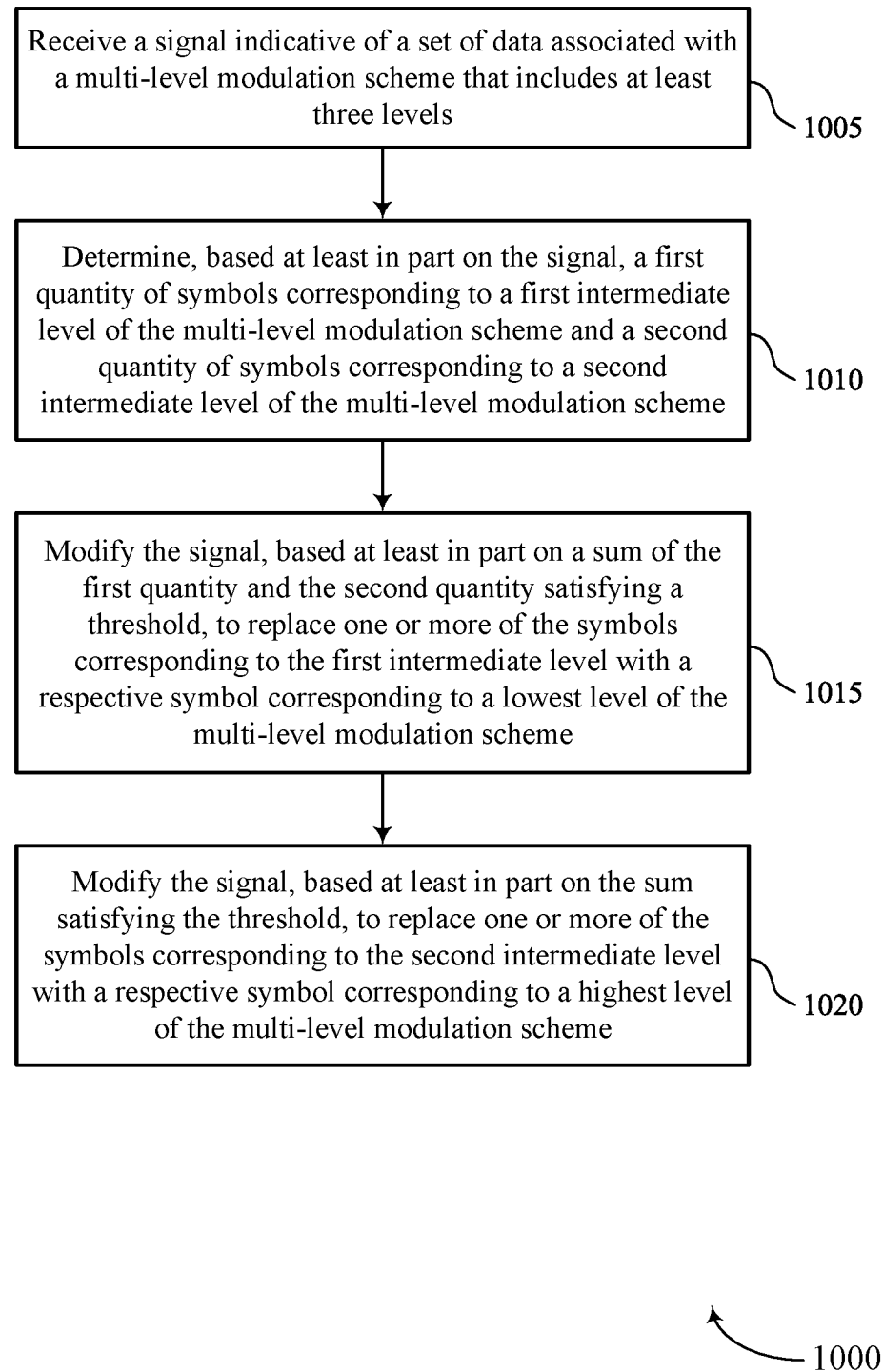

FIG. 10 shows a flowchart illustrating a method 1000 that supports a replacement scheme for a PAM bus in accordance with examples as disclosed herein. The operations of method 1000 may be implemented by a memory device or its components as described herein. For example, the operations of method 1000 may be performed by a memory device as described with reference to FIGS. 1 through 6. In some examples, a memory device may execute a set of instructions to control the functional elements of the device to perform the described functions. Additionally or alternatively, the memory device may perform aspects of the described functions using special-purpose hardware.

At 1005, the method may include receiving a signal indicative of a set of data associated with a multi-level modulation scheme that includes at least three levels. The operations of 1005 may be performed in accordance with examples as disclosed herein. In some examples, aspects of the operations of 1005 may be performed by a receiver 625 as described with reference to FIG. 6.

At 1010, the method may include determining, based at least in part on the signal, a first quantity of symbols corresponding to a first intermediate level of the multi-level modulation scheme and a second quantity of symbols corresponding to a second intermediate level of the multi-level modulation scheme. The operations of 1010 may be performed in accordance with examples as disclosed herein. In some examples, aspects of the operations of 1010 may be performed by a counter 630 as described with reference to FIG. 6.

At 1015, the method may include modifying the signal, based at least in part on a sum of the first quantity and the second quantity satisfying a threshold, to replace one or more of the symbols corresponding to the first intermediate level with a respective symbol corresponding to a lowest level of the multi-level modulation scheme. The operations of 1015 may be performed in accordance with examples as disclosed herein. In some examples, aspects of the operations of 1015 may be performed by a replacement circuitry 635 as described with reference to FIG. 6.

At 1020, the method may include modifying the signal, based at least in part on the sum satisfying the threshold, to replace one or more of the symbols corresponding to the second intermediate level with a respective symbol corresponding to a highest level of the multi-level modulation scheme. The operations of 1020 may be performed in accordance with examples as disclosed herein. In some examples, aspects of the operations of 1020 may be performed by a replacement circuitry 635 as described with reference to FIG. 6.

In some examples, an apparatus as described herein may perform a method or methods, such as the method 1000. The apparatus may include, features, circuitry, logic, means, or instructions (e.g., a non-transitory computer-readable medium storing instructions executable by a processor) for receiving a signal indicative of a set of data associated with a multi-level modulation scheme that includes at least three levels, determining, based at least in part on the signal, a first quantity of symbols corresponding to a first intermediate level of the multi-level modulation scheme and a second quantity of symbols corresponding to a second intermediate level of the multi-level modulation scheme, modifying the signal, based at least in part on a sum of the first quantity and the second quantity satisfying a threshold, to replace one or more of the symbols corresponding to the first intermediate level with a respective symbol corresponding to a lowest level of the multi-level modulation scheme, and modifying the signal, based at least in part on the sum satisfying the threshold, to replace one or more of the symbols corresponding to the second intermediate level with a respective symbol corresponding to a highest level of the multi-level modulation scheme.

Some examples of the method 1000 and the apparatus described herein may further include operations, features, circuitry, logic, means, or instructions for determining, based at least in part on the signal after the replacement, a third quantity of symbols corresponding to the lowest level and a fourth quantity of symbols corresponding to the first intermediate level of the multi-level modulation scheme and modifying the signal, based at least in part on a sum of the third quantity and the fourth quantity satisfying a second threshold, to replace one or more symbols corresponding to the lowest level with a respective symbol corresponding to the highest level.

Some examples of the method 1000 and the apparatus described herein may further include operations, features, circuitry, logic, means, or instructions for determining, based at least in part on the signal after the replacement, a third quantity of symbols corresponding to the lowest level and a fourth quantity of symbols corresponding to the first intermediate level of the multi-level modulation scheme and modifying the signal, based at least in part on a sum of the third quantity and the fourth quantity satisfying a second threshold, to replace one or more symbols corresponding to the first intermediate level with a respective symbol corresponding to the second intermediate level.

It should be noted that the methods described herein describe possible implementations, and that the operations and the steps may be rearranged or otherwise modified and that other implementations are possible. Further, portions from two or more of the methods may be combined.

Another apparatus is described. The apparatus may include a transceiver coupled with a data bus and a controller coupled with the transceiver, the controller configured to cause the apparatus to receive, at the transceiver, a signal indicative of a set of data associated with a multi-level modulation scheme that includes three or more levels, determine, based at least in part on the signal, a first quantity of symbols corresponding to a first level of the multi-level modulation scheme and a second quantity of symbols corresponding to a second level of the multi-level modulation scheme, and modify the signal, before transmission of the set of data over the data bus and based at least in part on a sum of the first quantity and the second quantity satisfying a threshold, to replace one or more of the symbols corresponding to the first level with a respective symbol corresponding to a third level of the multi-level modulation scheme In some examples of the apparatus, the controller may be further configured to cause the apparatus to modify the signal, based at least in part on the sum satisfying the threshold, to replace one or more of the symbols corresponding to the third level with a respective symbol corresponding to the first level.

In some examples of the apparatus, the controller may be further configured to cause the apparatus to determine, based at least in part on the signal after the replacement, a third quantity of symbols corresponding to the first level and a fourth quantity of symbols corresponding to the third level of the multi-level modulation scheme and modify the signal, based at least in part on a sum of the third quantity and the fourth quantity satisfying a second threshold, to replace one or more of the symbols corresponding to the third level with a respective symbol corresponding to a fourth level.

In some examples of the apparatus, the controller may be further configured to cause the apparatus to determine, based at least in part on the signal after the replacement, a third quantity of symbols corresponding to the first level and a fourth quantity of symbols corresponding to the third level of the multi-level modulation scheme and modify the signal, based at least in part on a sum of the third quantity and the fourth quantity satisfying a second threshold, to replace one or more of the symbols corresponding to the first level with a respective symbol corresponding to the second level.

In some examples of the apparatus, the controller may be further configured to cause the apparatus to modify the signal, based at least in part on the sum satisfying the threshold, to replace one or more of the symbols corresponding to the second level with a respective symbol corresponding to a fourth level of the multi-level modulation scheme.

In some examples of the apparatus, the controller may be further configured to cause the apparatus to modify the signal, based at least in part on the sum satisfying the threshold, to replace one or more of the symbols corresponding to the fourth level with a respective symbol corresponding to the second level of the multi-level modulation scheme.

In some examples of the apparatus, the controller may be further configured to cause the apparatus to determine a value for a metadata symbol based at least in part on the replacement, the value associated with a scheme for replacement for the set of data and transmit, by the transceiver, the metadata symbol and the signal indicative of the set of data after performing the replacement and based at least in part on determining the value associated with the scheme for replacement.

In some examples of the apparatus, the first level includes a first intermediate level of the multi-level modulation scheme and the second level includes a second intermediate level of the multi-level modulation scheme.

In some examples of the apparatus, the first level includes a lowest level of the multi-level modulation scheme and the second level includes an intermediate level of the multi-level modulation scheme.

Another apparatus is described. The apparatus may include a transceiver coupled with a data bus and a controller coupled with the transceiver, the controller configured to cause the apparatus to receive, at the transceiver over the data bus, a signal indicative of a set of data associated with a multi-level modulation scheme that includes three or more levels, determine a value of a metadata symbol associated with the set of data, where the value of the metadata symbol indicates a scheme for replacement employed by a device that transmitted the set of data, and modify the signal, based at least in part on the value of the metadata symbol, to replace one or more symbols corresponding to a first level of the multi-level modulation scheme with a respective symbol corresponding to a second level of the multi-level modulation scheme In some examples of the apparatus, the controller may be further configured to cause the apparatus to modify the signal, based at least in part on the value of the metadata symbol, to replace one or more symbols corresponding to the second level with a respective symbol corresponding to the first level.

In some examples of the apparatus, the controller may be further configured to cause the apparatus to modify the signal, based at least in part on the value of the metadata symbol, to replace one or more symbols corresponding to a third level of the multi-level modulation scheme with a respective symbol corresponding to a fourth level of the multi-level modulation scheme.

In some examples of the apparatus, the controller may be further configured to cause the apparatus to modify the signal, based at least in part on the value of the metadata symbol, to replace one or more symbols corresponding to the fourth level of the multi-level modulation scheme with a respective symbol corresponding to the third level of the multi-level modulation scheme.

In some examples of the apparatus, the controller may be further configured to cause the apparatus to modify the signal, after the replacement and based at least in part on the value of the metadata symbol, to replace one or more symbols corresponding to the second level with a respective symbol corresponding to a third level of the multi-level modulation scheme.

In some examples of the apparatus, the controller may be further configured to cause the apparatus to receive a signal indicative of the metadata symbol from the device that transmitted the signal indicative of the set of data.

In some examples of the apparatus, the first level includes an intermediate level of the multi-level modulation scheme and the second level includes a lowest level of the multi-level modulation scheme.

In some examples of the apparatus, the first level includes a lowest level of the multi-level modulation scheme and the second level includes a highest level of the multi-level modulation scheme.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The term "layer" or "level" used herein refers to a stratum or sheet of a geometrical structure (e.g., relative to a substrate). Each layer or level may have three dimensions (e.g., height, width, and depth) and may cover at least a portion of a surface. For example, a layer or level may be a three dimensional structure where two dimensions are greater than a third, e.g., a thin-film. Layers or levels may include different elements, components, and/or materials. In some examples, one layer or level may be composed of two or more sublayers or sublevels.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some examples, may be employed as an electrical contact to a memory cell or other component of a memory array. An electrode may include a trace, wire, conductive line, conductive layer, or the like that provides a conductive path between elements or components of a memory array.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
receiving a signal indicative of a set of data associated with a multi-level modulation scheme that includes three or more levels;
determining, based at least in part on the signal, a first quantity of symbols corresponding to a first level of the multi-level modulation scheme and a second quantity of symbols corresponding to a second level of the multi-level modulation scheme; and
modifying the signal, based at least in part on a sum of the first quantity of symbols and the second quantity of symbols satisfying a threshold, to replace one or more of the symbols corresponding to the first level with a respective symbol corresponding to a third level of the multi-level modulation scheme.

2. The method of claim 1, further comprising:
modifying the signal, based at least in part on the sum satisfying the threshold, to replace one or more of the symbols corresponding to the third level with a respective symbol corresponding to the first level.

3. The method of claim 1, further comprising:
determining, based at least in part on the signal after the replacement, a third quantity of symbols corresponding to the first level and a fourth quantity of symbols corresponding to the third level of the multi-level modulation scheme; and
modifying the signal, based at least in part on a sum of the third quantity of symbols and the fourth quantity of symbols satisfying a second threshold, to replace one or more of the symbols corresponding to the third level with a respective symbol corresponding to a fourth level.

4. The method of claim 1, further comprising:
determining, based at least in part on the signal after the replacement, a third quantity of symbols corresponding to the first level and a fourth quantity of symbols corresponding to the third level of the multi-level modulation scheme; and
modifying the signal, based at least in part on a sum of the third quantity of symbols and the fourth quantity of symbols satisfying a second threshold, to replace one or more of the symbols corresponding to the first level with a respective symbol corresponding to the second level.

5. The method of claim 1, further comprising:
modifying the signal, based at least in part on the sum satisfying the threshold, to replace one or more of the symbols corresponding to the second level with a respective symbol corresponding to a fourth level of the multi-level modulation scheme.

6. The method of claim 5, further comprising:
modifying the signal, based at least in part on the sum satisfying the threshold, to replace one or more of the symbols corresponding to the fourth level with a respective symbol corresponding to the second level of the multi-level modulation scheme.

7. The method of claim 1, further comprising:
determining a value for a metadata symbol based at least in part on the replacement, the value associated with a scheme for replacement for the set of data; and
transmitting the metadata symbol and the signal indicative of the set of data after performing the replacement and based at least in part on determining the value associated with the scheme for replacement.

8. The method of claim 1, wherein the first level comprises a first intermediate level of the multi-level modulation scheme and the second level comprises a second intermediate level of the multi-level modulation scheme.

9. The method of claim 1, wherein the first level comprises a lowest level of the multi-level modulation scheme and the second level comprises an intermediate level of the multi-level modulation scheme.

10. An apparatus, comprising:
a transceiver coupled with a data bus; and
a controller coupled with the transceiver, the controller configured to cause the apparatus to:
receive, at the transceiver, a signal indicative of a set of data associated with a multi-level modulation scheme that includes three or more levels;
determine, based at least in part on the signal, a first quantity of symbols corresponding to a first level of the multi-level modulation scheme and a second quantity of symbols corresponding to a second level of the multi-level modulation scheme; and
modify the signal, before transmission of the set of data over the data bus and based at least in part on a sum of the first quantity of symbols and the second quantity of symbols satisfying a threshold, to replace one or more of the symbols corresponding to the first level with a respective symbol corresponding to a third level of the multi-level modulation scheme.

11. The apparatus of claim 10, wherein the controller is further configured to cause the apparatus to:
modify the signal, based at least in part on the sum satisfying the threshold, to replace one or more of the symbols corresponding to the third level with a respective symbol corresponding to the first level.

12. The apparatus of claim 10, wherein the controller is further configured to cause the apparatus to:
determine, based at least in part on the signal after the replacement, a third quantity of symbols corresponding to the first level and a fourth quantity of symbols corresponding to the third level of the multi-level modulation scheme; and
modify the signal, based at least in part on a sum of the third quantity of symbols and the fourth quantity of symbols satisfying a second threshold, to replace one or more of the symbols corresponding to the third level with a respective symbol corresponding to a fourth level.

13. The apparatus of claim 10, wherein the controller is further configured to cause the apparatus to:
determine, based at least in part on the signal after the replacement, a third quantity of symbols corresponding to the first level and a fourth quantity of symbols corresponding to the third level of the multi-level modulation scheme; and
modify the signal, based at least in part on a sum of the third quantity of symbols and the fourth quantity of symbols satisfying a second threshold, to replace one or more of the symbols corresponding to the first level with a respective symbol corresponding to the second level.

14. The apparatus of claim 10, wherein the controller is further configured to cause the apparatus to:
modify the signal, based at least in part on the sum satisfying the threshold, to replace one or more of the symbols corresponding to the second level with a respective symbol corresponding to a fourth level of the multi-level modulation scheme.

15. The apparatus of claim 14, wherein the controller is further configured to cause the apparatus to:
modify the signal, based at least in part on the sum satisfying the threshold, to replace one or more of the symbols corresponding to the fourth level with a respective symbol corresponding to the second level of the multi-level modulation scheme.

16. The apparatus of claim 10, wherein the controller is further configured to cause the apparatus to:
determine a value for a metadata symbol based at least in part on the replacement, the value associated with a scheme for replacement for the set of data; and
transmit, by the transceiver, the metadata symbol and the signal indicative of the set of data after performing the replacement and based at least in part on determining the value associated with the scheme for replacement.

17. The apparatus of claim 10, wherein the first level comprises a first intermediate level of the multi-level modulation scheme and the second level comprises a second intermediate level of the multi-level modulation scheme.

18. The apparatus of claim 10, wherein the first level comprises a lowest level of the multi-level modulation scheme and the second level comprises an intermediate level of the multi-level modulation scheme.

19. A method, comprising:
receiving, over a data bus, a signal indicative of a set of data associated with a multi-level modulation scheme that includes three or more levels;
determining a value of a metadata symbol associated with the set of data, wherein the value of the metadata symbol indicates a scheme for replacement employed by a device that transmitted the set of data; and
modifying the signal, based at least in part on the value of the metadata symbol, to replace one or more symbols corresponding to a first level of the multi-level modulation scheme with a respective symbol corresponding to a second level of the multi-level modulation scheme.

20. The method of claim 19, further comprising:
modifying, based at least in part on the value of the metadata symbol, to replace one or more symbols corresponding to the second level with a respective symbol corresponding to the first level.

21. The method of claim 19, further comprising:
modifying, based at least in part on the value of the metadata symbol, to replace one or more symbols corresponding to a third level of the multi-level modulation scheme with a respective symbol corresponding to a fourth level of the multi-level modulation scheme.

22. The method of claim 21, further comprising:
modifying, based at least in part on the value of the metadata symbol, to replace one or more symbols corresponding to the fourth level of the multi-level modulation scheme with a respective symbol corresponding to the third level of the multi-level modulation scheme.

23. The method of claim 19, further comprising:
modifying, after the replacement and based at least in part on the value of the metadata symbol, to replace one or more symbols corresponding to the second level with a respective symbol corresponding to a third level of the multi-level modulation scheme.

24. The method of claim 19, further comprising:
receiving a signal indicative of the metadata symbol from the device that transmitted the signal indicative of the set of data.

25. The method of claim 19, wherein the first level comprises an intermediate level of the multi-level modulation scheme and the second level comprises a lowest level of the multi-level modulation scheme.

26. The method of claim 19, wherein the first level comprises a lowest level of the multi-level modulation scheme and the second level comprises a highest level of the multi-level modulation scheme.

27. An apparatus, comprising:
a transceiver coupled with a data bus; and
a controller coupled with the transceiver, the controller configured to cause the apparatus to:
receive, at the transceiver over the data bus, a signal indicative of a set of data associated with a multi-level modulation scheme that includes three or more levels;
determine a value of a metadata symbol associated with the set of data, wherein the value of the metadata symbol indicates a scheme for replacement employed by a device that transmitted the set of data; and
modify the signal, based at least in part on the value of the metadata symbol, to replace one or more symbols corresponding to a first level of the multi-level modulation scheme with a respective symbol corresponding to a second level of the multi-level modulation scheme.

28. The apparatus of claim 27, wherein the controller is further configured to cause the apparatus to:
modify the signal, based at least in part on the value of the metadata symbol, to replace one or more symbols corresponding to the second level with a respective symbol corresponding to the first level.

29. The apparatus of claim 27, wherein the controller is further configured to cause the apparatus to:
modify the signal, based at least in part on the value of the metadata symbol, to replace one or more symbols corresponding to a third level of the multi-level modulation scheme with a respective symbol corresponding to a fourth level of the multi-level modulation scheme.

30. The apparatus of claim 29, wherein the controller is further configured to cause the apparatus to:
modify the signal, based at least in part on the value of the metadata symbol, to replace one or more symbols corresponding to the fourth level of the multi-level modulation scheme with a respective symbol corresponding to the third level of the multi-level modulation scheme.

31. The apparatus of claim 27, wherein the controller is further configured to cause the apparatus to:
modify the signal, after the replacement and based at least in part on the value of the metadata symbol, to replace one or more symbols corresponding to the second level with a respective symbol corresponding to a third level of the multi-level modulation scheme.

32. The apparatus of claim 27, wherein the controller is further configured to cause the apparatus to:
receive a signal indicative of the metadata symbol from the device that transmitted the signal indicative of the set of data.

33. The apparatus of claim 27, wherein the first level comprises an intermediate level of the multi-level modulation scheme and the second level comprises a lowest level of the multi-level modulation scheme.

34. The apparatus of claim 27, wherein the first level comprises a lowest level of the multi-level modulation scheme and the second level comprises a highest level of the multi-level modulation scheme.

35. A method, comprising:
    receiving a signal indicative of a set of data associated with a multi-level modulation scheme that includes at least three levels;
    determining, based at least in part on the signal, a first quantity of symbols corresponding to a first intermediate level of the multi-level modulation scheme and a second quantity of symbols corresponding to a second intermediate level of the multi-level modulation scheme;
    modifying the signal, based at least in part on a sum of the first quantity of symbols and the second quantity of symbols satisfying a threshold, to replace one or more of the symbols corresponding to the first intermediate level with a respective symbol corresponding to a lowest level of the multi-level modulation scheme; and
    modifying the signal, based at least in part on the sum satisfying the threshold, to replace one or more of the symbols corresponding to the second intermediate level with a respective symbol corresponding to a highest level of the multi-level modulation scheme.

* * * * *